April 3, 1956     E. S. LITCHFIELD     2,740,677

PISTON FOR INTERNAL COMBUSTION ENGINE

Filed March 6, 1953

*INVENTOR.*
EVERETT S. LITCHFIELD
BY
Knox & Knox
AGENTS

United States Patent Office 2,740,677
Patented Apr. 3, 1956

2,740,677
PISTON FOR INTERNAL COMBUSTION ENGINE

Everett S. Litchfield, National City, Calif.

Application March 6, 1953, Serial No. 340,764

3 Claims. (Cl. 309—7)

The present invention relates generally to an internal combustion engine and more particularly to a piston for such an engine.

A primary object of this invention is to provide a piston having means for preventing escape to the crank case of gases from the combustion chamber, during compression and combustion cycles, through the ring grooves behind the rings.

A secondary object of this invention is to provide a piston in which one, or more, of the piston ring grooves is provided with novel means for draining excess oil collected by the piston rings.

Another object of the invention is to provide for an efficient valve action between the lower side of the piston ring and the lower side of the piston ring groove, between the oil drainage groove and the vertical wall of the ring groove.

Another object of this invention is to provide oil drainage means which may be applied to many types of pistons in present use.

Another object of this invention is to provide a piston having a ring groove, the structure of which allows a piston ring installed therein to perform the dual function of an oil ring and a compression ring.

Another object of this invention is to provide a piston which is adapted for fabrication from many different materials, so that the choice of material can be according to the dictates of availability and price considerations, the exact sizes and proportions being matters easily determined to suit particular conditions and needs.

Another object of this invention is to provide a piston which is inexpensive and practicable to manufacture.

Finally, it is an object to provide a piston of the aforementioned character which is simple, safe and convenient to operate, and which will give generally efficient and durable service.

With these and other objects definitely in view, this invention consists in the novel construction, combination, and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
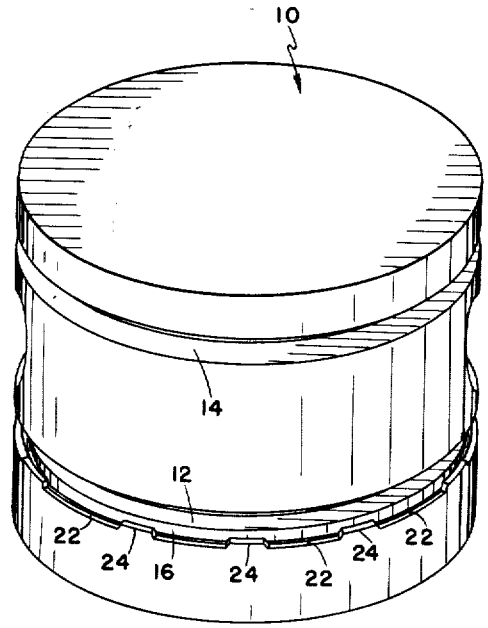
Fig. 1 is a perspective view of the piston.

Referring now to the drawing in detail, the piston comprises a body 10 of substantially conventional design and provided with piston ring grooves 12 and 14, two being shown as an example. The ring groove 12 is provided with an annular recess or undercut portion, illustrated as a substantially V-shaped, annular trough 16, in the lower surface 17 of said ring groove, said trough having at the bottom thereof a plurality of drainage slots 18 which communicate with the interior of the piston 10. Although the trough 16 is shown adjacent the periphery of the ring groove 12, the precise location is not restricted to this position, the principal limitation being that said trough must fall below the piston ring, as hereinafter described, and spaced a considerable distance from the vertical wall of the groove 12.

Figure 2:
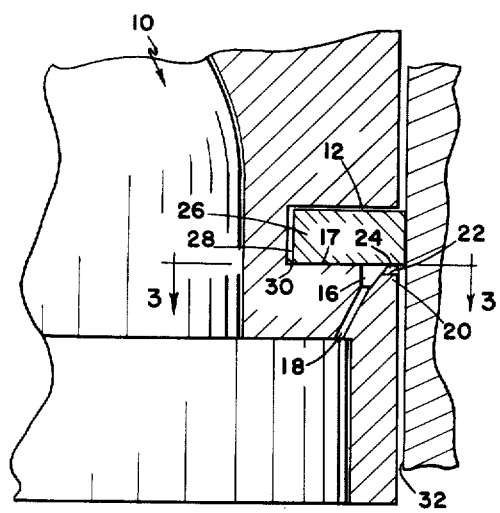
Fig. 2 is an enlarged, fragmentary, vertical sectional view of the piston ring groove, showing the piston ring in the position attained during the upward stroke of the piston.
Figure 3:
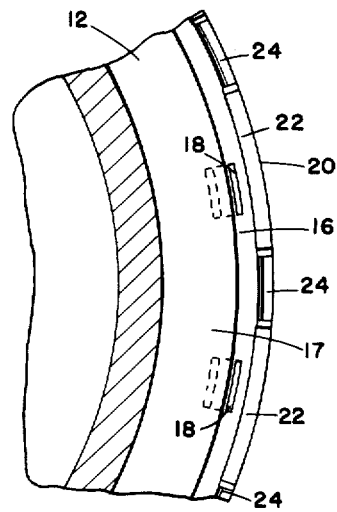
Fig. 3 is a sectional view taken on the line 3—3 of Fig. 2.

The trough 16 may be spaced inwardly from the perimeter of the piston and when so located an outer rim 20 of the trough 16 is notched at intervals as indicated at 22, the portions of the rim remaining between the notches comprising the shoulders 24 which support the outer edge of the piston ring 26 as illustrated in Fig. 2. These shoulders prevent any possible tilting of the piston ring and therefore prevent vibration or chattering of said piston ring during operation.

The piston ring 26 is allowed certain clearances in the ring groove 12 for expansion and fitting, these clearances permitting a slight vertical movement of the piston ring and leaving a gap 28 between the inner wall of said piston ring and the vertical wall 30 of said ring groove.

It will be evident from an inspection of Fig. 2, that the piston ring 26 is seated firmly on the lower surface 17 of the ring groove 12 and on the shoulders 24, on the upward stroke of the piston. As the piston moves upwardly, the piston ring scrapes a film of oil from the cylinder wall 32 which is shown fragmentarily for descriptive purposes. The oil removed from the cylinder wall 32 flows along the upper surface of the piston ring and is trapped in the gap 28, the compression in the cylinder being sufficient to hold said piston ring firmly in place and to prevent the oil from reaching the drainage slots 18. A fluid seal is thus achieved and loss of compression is prevented while the efficiency of the engine is improved.

Figure 4:
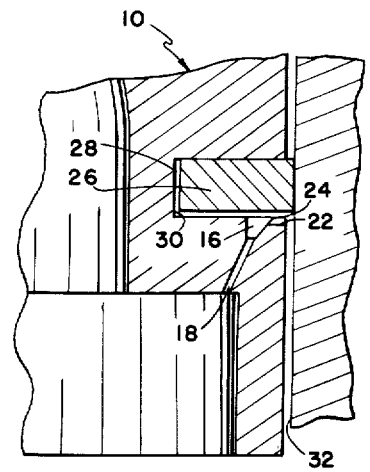
Fig. 4 is a fragmentary sectional view similar to Fig. 2, but showing the piston ring in the position attained during the downward stroke.

As soon as the piston commences downward travel, the piston ring 26 will be moved upwardly against the upper surface of the ring groove, by friction on the cylinder wall and crank case pressure, to the position shown in Fig. 4. In this position, the piston ring will scrape a film of oil from the cylinder wall 32, said oil being conducted beneath said piston ring and collected in the trough 16, from where it is drained through the slots 18 and returned to the crank case. This last action would normally take place on the exhaust stroke of a four-cycle engine.

In a two-cycle engine, or on the power stroke of a four-cycle engine, the piston ring 26 is held firmly against the lower surface 17, as shown in Fig. 2 by the pressure of the explosion above the piston. However, the oil removed from the cylinder wall by the piston ring can still escape through the notches 22 and drain to the crank case.

Although the specific structure described has been applied to one ring groove only, the arrangement may be extended to other ring grooves of the piston according to design requirements. It should be noted that the novel structure of the ring groove allows a single piston ring to perform the dual function of an oil ring and a compression ring.

The invention provides for efficient oil drainage without loss of compression and with increased efficiency, and the structure may be applied to many types of pistons by simple machine operations.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A piston for an internal combustion engine, comprising: a generally cylindrical, hollow body with a circumferential ring groove having a vertical wall and an upper and a lower surface; said lower surface having an undercut portion in said lower surface and spaced from said vertical wall; said undercut portion having means of communication with both the exterior and interior of the cylindrical hollow body; and a piston ring operatively mounted in said groove; said undercut portion constituting a reservoir for temporary storage of oil collected by the ring on the down strokes; said ring having sealing engagement with a portion of said lower surface between said undercut portion and said vertical wall when in one position as during the compression stroke of the piston; whereby said piston ring performs the dual function of an oil ring and a compression ring.

2. A piston according to claim 1 wherein said undercut portion is in an intermediate portion of said lower surface, a rim on said body on the side of said undercut portion remote from said portion of said lower surface; said means of communication including notches extending radially through said rim.

3. A piston according to claim 2 wherein portions of said rim between said notches have their upper extremities in the plane of said lower surface; said extremities constituting shoulders engaging outer, lower edge portions of said ring and preventing tilting of the ring during a compression stroke.

References Cited in the file of this patent

UNITED STATES PATENTS

| | | |
|---|---|---|
| 1,737,658 | Howe | Dec. 3, 1929 |
| 1,738,534 | Johnson | Dec. 10, 1929 |
| 2,396,018 | Mis | Mar. 5, 1946 |
| 2,608,452 | Hollingsworth | Aug. 26, 1952 |
| 2,653,065 | Appleton | Sept. 22, 1953 |